United States Patent [19]

Furomoto et al.

[11] Patent Number: 4,590,238

[45] Date of Patent: May 20, 1986

[54] HIGH-SOLID SELF-ADHESIVE AND PROCESS FOR THE PRODUCTION THEREOF

[75] Inventors: Mitsuru Furomoto; Toshio Asano, both of Arai, Japan

[73] Assignee: Daicel Chemical Industries, Ltd., Sakai, Japan

[21] Appl. No.: 578,891

[22] Filed: Feb. 10, 1984

[30] Foreign Application Priority Data

Feb. 18, 1983 [JP] Japan .................................. 58-25760

[51] Int. Cl.$^4$ ...................... C08L 33/26; C08L 33/14; C08L 33/08; C08L 33/10
[52] U.S. Cl. .................................. 524/745; 524/747; 524/753; 524/755; 524/760; 524/777; 524/831; 524/833
[58] Field of Search ............... 524/831, 833, 747, 755, 524/760, 753, 777

[56] References Cited

U.S. PATENT DOCUMENTS

| | | | |
|---|---|---|---|
| 2,868,752 | 1/1959 | Frazier | 524/831 |
| 3,231,534 | 1/1966 | Blades | 524/831 |
| 4,151,146 | 4/1979 | Patella | 524/833 |
| 4,166,882 | 9/1979 | Das | 524/831 |

FOREIGN PATENT DOCUMENTS

| | | | |
|---|---|---|---|
| 0051169 | 5/1982 | European Pat. Off. | 524/831 |
| 1809742 | 7/1969 | Fed. Rep. of Germany | 524/831 |
| 0001463 | 1/1970 | Japan | 524/833 |
| 0025377 | 2/1982 | Japan | 524/831 |
| 2059425 | 4/1981 | United Kingdom | 524/831 |
| 2071122 | 9/1981 | United Kingdom | 524/833 |

Primary Examiner—C. Warren Ivy
Attorney, Agent, or Firm—Flynn, Thiel, Boutell & Tanis

[57] ABSTRACT

A high-solid self-adhesive having a solid content of 65 to 75% by weight and composed of an emulsion obtained by emulsion-copolymerizing a vinyl monomer mixture containing acrylate esters as the main ingredient and further at least one hydrophilic monomer of formula (A), (B) or (C).

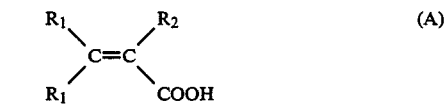

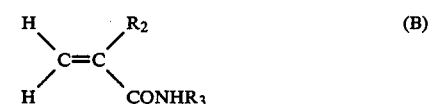

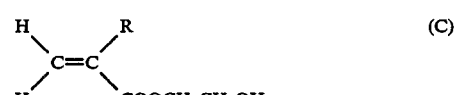

wherein $R_1$ is H or COOH, $R_2$ is H or $CH_3$ and $R_3$ is H or $CH_2OH$.

A process for the production of the high-solid self-adhesive comprising successively adding a pre-emulsion obtained by previously mixing said vinyl monomer mixture, a surfactant mixture of a nonionic surfactant and an anionic surfactant and water, to the reaction system to carry out an emulsion copolymerization in the presence of a catalyst.

14 Claims, No Drawings

HIGH-SOLID SELF-ADHESIVE AND PROCESS FOR THE PRODUCTION THEREOF

BACKGROUND OF THE INVENTION

1. Field of the Invention

The present invention relates to a high-solid self-adhesive composition which is obtained by emulsion-copolymerizing a vinyl monomer mixture containing at least one hydrophilic monomer, and also to a process for the production thereof.

2. Description of the Prior Art

Methods of obtaining high-solid latexes have been disclosed in the specifications of Japanese Patent Laid-Open Nos. 84092/1978 and 141311/1981. However, these methods required two complicated stages and the solid content of the resultant latex was as low as 70% at best. Further, no high-solid latex applicable to a self-adhesive has yet been discovered, although the use of a high-solid latex is highly desired in the self-adhesive market from the viewpoint of saving energy for drying the self-adhesive during coating.

We have found a process of obtaining a stable latex in one stage, said latex having a solid content of as high as 65 to 75% by weight, unlike conventional latexes. We have also found that the high-solid latex obtained from this process is very useful for self-adhesive purposes in particular. The present invention is based on these findings.

SUMMARY OF THE INVENTION

An object of the present invention is to provide a high-solid self-adhesive composition which has a solid content of 65 to 75% by weight and is composed of an emulsion obtained by emulsion-copolymerizing a vinyl monomer mixture mainly composed of acrylate esters and containing 0.5 to 15% by weight of at least one member selected from the group consisting of hydrophilic monomers of formulas (A), (B) and (C):

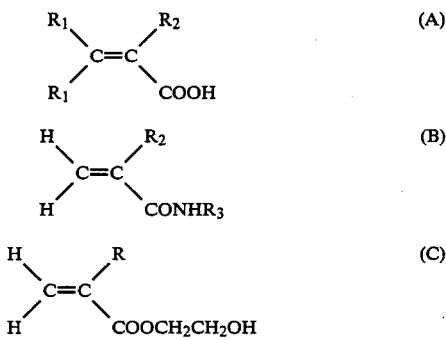

wherein $R_1$ is H or COOH, $R_2$ is H or $CH_3$, and $R_3$ is H or $CH_2OH$.

Another object of the present invention is to provide a process for the production of a high-solid self-adhesive composition by emulsion-copolymerizing a vinyl monomer mixture mainly composed of acrylate esters and containing 0.5 to 15% by weight of at least one member selected from the group consisting of the hydrophilic monomers of the above-mentioned formulas (A), (B) and (C), which comprises successively adding a pre-emulsion obtained by previously mixing the vinyl monomer mixture, an emulsifier and water together to the reaction system to carry out the emulsion copolymerization in the presence of a catalyst and to obtain a polymer emulsion having a solid content of 65 to 75% by weight, said emulsifier being a surfactant mixture consisting of a nonionic surfactant and an anionic surfactant which is used in an amount of 5 to 40% by weight based on that of the nonionic surfactant. The emulsifier is used in an amount of 2 to 15 wt. % based on the total weight of the monomers.

DETAILED DESCRIPTION OF PREFERRED EMBODIMENTS

The hydrophilic monomers of the above formulas (A), (B) and (C) are used for the purpose of obtaining a low-viscosity latex and imparting polymerization stability required for obtaining a high-solid latex. Examples of the hydrophilic monomers include acrylic acid, methacrylic acid, fumaric acid, maleic acid, acrylamide, methacrylamide, N-methylolacrylamide, N-methylolmethacrylamide, 2-hydroxyethyl acrylate, and 2-hydroxyethyl methacrylate. The hydrophilic monomer is used in an amount of 0.5 to 15% by weight, preferably 1 to 10% by weight, based on that of the vinyl monomer mixture. When the amount is less than 0.5% by weight, no stable latex can be obtained, while when it exceeds 15% by weight, the resultant resin becomes hard and no desirable tackiness can be obtained.

The vinyl monomer mixture of the present invention is mainly composed of acrylate esters. Examples of the acrylate ester monomers include methyl acrylate, ethyl acrylate, propyl acrylate, butyl acrylate, 2-ethylhexyl acrylate, and decyl acrylate. These monomers are used in amounts of at least 50% by weight of the total vinyl monomer mixture. Examples of other vinyl monomers which can be used include methyl methacrylate, ethyl methacrylate, propyl methacrylate, butyl methacrylate, hexyl methacrylate, octyl methacrylate, vinyl acetate, styrene, ethylene, and vinyl chloride.

The high-solid self-adhesive composition of the present invention is one having a solid content of as high as 65 to 75% by weight obtained by emulsion-copolymerizing a monomer component containing one or more acrylate esters mentioned above with the above-described hydrophilic monomer. The solid content is a value obtained by weighing about 1 g of a sample, i.e., a stock emulsion solution, in an aluminum dish, drying the sample in a hot-air dryer at 105° C., and determining the content according to the following equation:

$$\text{solid content (\%)} = \frac{\text{Weight after drying}}{\text{Weight of stock emulsion solution}} \times 100$$

In a preferred embodiment, the high-solid self-adhesive of the present invention is produced in the following manner.

5 to 30% by weight of a pre-emulsion, i.e., a mixture consisting of a vinyl monomer mixture mainly composed of acrylate esters and containing 0.5 to 15% by weight of the above-described hydrophilic monomer, a surfactant and water, is added to a reaction system containing preferably an appropriate amount of water just before polymerization. Then the remaining 70 to 95% by weight of the pre-emulsion and a catalyst are separately and successively added to the reaction system at a reaction temperature to carry out an emulsion copolymerization. A preferred surfactant is a mixture of an anionic surfactant and a nonionic surfactant, wherein the anionic surfactant is used in an amount of preferably 5 to 40% by weight of the nonionic surfactant. When the ratio of the surfactants is outside the range mentioned above, the stability of the polymer latex becomes poor, or the particle size becomes too small and the viscosity is increased so that it is difficult to obtain a high-solid self-adhesive composition. The amount of the surfactant to be added is 2 to 15% by weight, preferably 3 to 10% by weight based on the combined amount of the monomers. When the amount is less than 2% by weight, no stable polymer latex can be obtained, while when it exceeds 15% by weight, the particle size of the latex becomes too small and the viscosity is increased so that it becomes difficult to increase the solid content.

Examples of the surfactants which can be used in the present invention include anionic surfactants such as various fatty acid salt, higher alcohol sulfates, alkylbenzenesulfonates, dialkyl sulfosuccinates, polyoxyethylene alkyl ether sulfates, or polyoxyethylene alkylphenol ether sulfates, and nonionic surfactants such as polyoxyethylene alkyl ethers, polyoxyethylene alkylphenol ethers, sorbitan fatty acid esters, polyoxyethylene fatty acid esters, polyoxyethylene sorbitan fatty acid esters, or polyoxyethylene/polyoxypropylene block copolymer.

As the catalyst, persulfates such as potassium persulfate and ammonium persulfate are preferred and may be used in combination with various reducing agents as redox catalyst. The catalyst is used in an amount of 0.1 to 1% by weight based on that of the monomer.

The emulsion copolymerization is usually carried out at a temperature of 50° to 90° C. for 5 to 10 hr. In the present invention, however, there is employed a pre-emulsion process comprising successively adding a pre-emulsion, i.e., a mixture of a vinyl monomer mixture containing a hydrophilic monomer, a surfactant and water to the reaction system so that the emulsion copolymerization may be carried out while successively adding the pre-emulsion and the catalyst to the reaction system. If no liquid is present at the initial stage of the polymerization in usual industrial practice, agitating blades cannot be turned during the polymerization so that it is difficult to control the heat of polymerization and to smoothly carry out the emulsion copolymerization. Therefore, any of the following successive addition methods (1), (2) and (3) may be used in the practice of the present invention.

(1) First, part of the water is charged in a reactor. A mixture (pre-emulsion) consisting of a monomer mixture, surfactants and the remainder of water, and a catalyst are then separately and successively added thereto to carry out the emulsion copolymerization.

(2) First, 5 to 30% by weight, for example, about 10% by weight of a mixture (pre-emulsion) consisting of a monomer mixture, surfactants and the whole of water is charged in the reactor. The remainder of the pre-emulsion, and a catalyst are then separately and successively added thereto.

(3) Part of water is previously charged in the reactor. 5 to 30% by weight of a mixture (pre-emulsion) consisting of a monomer mixture, surfactants and the remainder of water is added thereto just before polymerization. Then the remaining 70 to 95% by weight of the pre-emulsion and a catalyst are separately and successively added.

The particle size of the obtained latex is at least $0.2\mu$ and usually $2.0\mu$ or below to give a latex viscosity which does not cause any troubles in practical use. Usually, the viscosity of the latex is within the range of 500 to 30,000 cP. The resultant latex is stable and can be used as a high-solid self-adhesive composition having excellent sticking characteristics.

Additives such as anti-foaming agent, thickening agent, tackifier, or pigment may be added to the high-solid self-adhesive of the present invention. The self-adhesive composition can be applied to various uses by utilizing its sticking characteristics, and is particularly effective for use on self-adhesive tapes and sheets and also is useful as a tackifier and sealing agent.

The following examples and comparative examples are provided to illustrate the present invention, but are not to be construed as limiting the present invention in any way. Parts and % given below are by part unless otherwise stated.

EXAMPLE 1

8 parts of water was charged in a polymerizer and 15% of a mixture consisting of 18 parts of water, 8 parts of vinyl acetate, 30 parts of butyl acrylate, 25 parts of 2-ethylhexyl acrylate, 0.6 part of methacrylamide, 3 parts of methacrylic acid, 4 parts of a nonionic surfactant (polyoxyethylene octylphenyl ether) and 0.9 part of an anionic surfactant (sodium dodecylbenzenesulfonate) was added thereto and heated. The remaining 85% of the above mixture and an aqueous potassium persulfate solution were successively added thereto at about 70° C. over a period of 5 hr to carry out emulsion polymerization. The solid concentration of the resultant latex was 71.5% and the viscosity thereof was 7000 cP.

EXAMPLE 2

6.5 parts of water was charged in a polymerizer and 10% of a mixture consisting of 20 parts of water, 6 parts of vinyl acetate, 55 parts of butyl acrylate, 1.5 parts of 2-hydroxyethyl methacrylate, 2.5 parts of methacrylic acid, 3.5 parts of a nonionic surfactant (polyoxyethylene lauryl ether) and 0.8 part of an anionic surfactant (sodium laurylsulfate) was added thereto and heated. The remaining 90% of the above mixture and an aqueous ammonium persulfate solution were successively added thereto at about 75° C. over a period of 4 hr to carry out emulsion copolymerization. The solid concentration of the resultant latex was 68.5% and the viscosity thereof was 12000 cP.

EXAMPLE 3

5 parts of water was charged in a polymerizer and 20% of a mixture consisting of 18 parts of water, 8 parts of ethyl methacrylate, 58 parts of 2-ethylhexyl acrylate, 0.8 part of acrylamide, 2 parts of methacrylic acid, 3.5 parts of a nonionic surfactant (polyoxyethylene nonylphenyl ether) and 0.7 part of an anionic surfactant (sodium polyoxyethylene alkylphenyl ether sulfate) was added thereto and heated. The remaining 80% of the above mixture and an aqueous ammonium persulfate solution were successively added thereto at about 75° C. over a period of 5 hr to carry out emulsion copolymerization. The solid concentration of the resultant latex was 73% and the viscosity thereof was 7000 cP.

COMPARATIVE EXAMPLE 1

The same starting materials as those of Example 1 were used in the same amounts as those of Example 1, and the polymerization procedure was repeated with the following modification of the conditions. 26 parts of water and the whole amounts of the nonionic and anionic surfactants were charged in the polymerizer and 15% of the monomer mixture was added thereto and heated. The remaining 85% of the above monomer mixture and the aqueous potassium persulfate solution were successively added thereto at about 70° C. over a period of 5 hr to carry out the emulsion copolymerization. The solid concentration of the resultant latex was 70.5% and the viscosity thereof was 5000 cP.

COMPARATIVE EXAMPLE 2

The procedure of Example 3 was repeated except that 2.8 parts of methyl methacrylate was used in place of acrylamide and methacrylic acid to carry out the emulsion copolymerization. The solid concentration of the resultant latex was 71% and the viscosity thereof was 30000 cP. The latex was very unstable.

Each of the latexes obtained in the above Examples and Comparative Examples was applied to a release paper in such an amount as to give an areal weight of about 25 g/m² (on a dry basis), dried at 105° C. for 3 min and transferred onto a polyester film of 25μ in thickness. The adhesive strength, the tack and the holding power of the resultant self-adhesive tape were evaluated. The results are shown in Table 1.

TABLE 1

| Evaluation item | Adhesive strength (g) (note 1) | Tack (note 2) | Holding powder (min) (note 3) |
|---|---|---|---|
| Example 1 | 1100 | 10 | 90 or longer |
| Example 2 | 1200 | 10 | 90 or longer |
| Example 3 | 1200 | 11 | 90 or longer |
| Comp. Ex. 1 | 800 | 6 | 30 |
| Comp. Ex. 2 | 500 | 5 | 40 | note 1: The adhesive strength is expressed in g by determining it in such a manner that the self-adhesive film is pressed against a stainless sheet of 25 mm in width at 20° C. and 65% RH and, after 60 min, a force required to peel the film off at an angle of 180 degrees and at a pulling rate of 300 mm/min is measured.
note 2: The tack is expressed by the ball No. of the largest one among steel balls which are caused to stop when they are rolled down along the surface of the self-adhesive film of 10 cm inclined at an angle of 30 degrees at 20° C. and 65% RH according to J. Dow method.
note 3: The holding power is expressed in minutes by determining it in such a manner that the section of 25 mm × 25 mm of the self-adhesive film is pressed against a stainless sheet, a load of 1 kg is applied thereto at 40° C. and the time which has elapsed until the load falls is measured.

What is claimed is:

1. A process for preparing an adhesive composition which consists essentially of the steps of mixing (A) a mixture of vinyl monomers containing (1) at least 50% by weight of alkyl acrylate ester monomer component, based on the weight of said mixture, said alkyl acrylate ester monomer component being selected from the group consisting of methyl acrylate, ethyl acrylate, propyl acrylate, butyl acrylate, 2-ethylhexyl acrylate, decyl acrylate and mixtures thereof, and (2) from 1 to 10% by weight of hydrophilic vinyl monomer component, based on the weight of said mixture, said hydrophilic vinyl monomer component being at least one member selected from the group consisting of hydrophilic vinyl monomers having the formulas

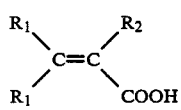  (A)

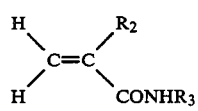  (B)

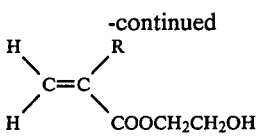  (C)

wherein $R_1$ is H or COOH, $R_2$ is H or $CH_3$ and $R_3$ is H or $CH_2OH$, with (B) an emulsifier component, and with (C) water, to obtain a pre-emulsion that is free of an initiator for initiating polymerization of said monomers, said pre-emulsion containing from 3 to 10% by weight of said emulsifier component, based on the weight of said mixture of vinyl monomers, said emulsifier component consisting of a mixture of a nonionic surfactant and an anionic surfactant wherein the amount of said anionic surfactant is from 5 to 40% by weight, based on the weight of said nonionic surfactant, said anionic surfactant being selected from the group consisting of fatty acid salts, higher alcohol sulfates, alkylbenzene sulfonates, dialkyl sulfosuccinates, polyoxyethylene alkyl ether sulfates and polyoxyethylene alkylphenol ether sulfates, and said nonionic surfactant is selected from the group consisting of polyoxyethylene alkyl ethers, polyoxyethylene alkylphenol ethers, sorbitan fatty acid esters, polyoxyethylene fatty acid esters, polyoxyethylene sorbitan fatty acid esters and polyoxyethylene-/polyoxypropylene block copolymers; placing in a polymerization reactor an initial charge consisting essentially of either (i) water, (ii) from 5 to 30% by weight of the total amount of said pre-emulsion, or (iii) both of (i) and (ii); then separately and successively adding to said initial charge (a) the remainder of said pre-emulsion and (b) the entire amount of an initiator for initiating polymerization of said monomers, over a period of time and under conditions effective to carry out emulsion copolymerization of said monomers whereby to obtain an aqueous latex containing from 65 to 75% by weight of solids and having a viscosity in the range of from 500 to 30,000 cP, said solids having an average particle size in the range of from 0.2 to 2.0 microns, the amount of said initiator being in the range of from 0.1 to 1.0% by weight, based on the weight of said mixture of vinyl monomers.

2. A process as claimed in claim 1 in which said alkyl acrylate ester monomer component is selected from the group consisting of butyl acrylate, 2-ethylhexyl acrylate and mixtures thereof, said initiator is potassium persulfate which is added to said initial charge in the form of an aqueous solution, said aqueous latex containing from 68.5 to 73% by weight of solids and having a viscosity of from 7000 to 12,000 cP.

3. An adhesive composition prepared by the process of claim 1.

4. A process for preparing an adhesive composition which comprises the steps of mixing (A) a mixture of vinyl monomers containing (1) at least 50% by weight of alkyl acrylate ester monomer component, based on the weight of said mixture, and (2) from 0.5 to 15% by weight of hydrophilic vinyl monomer component, based on the weight of said mixture, said hydrophilic vinyl monomer component being at least one member selected from the group consisting of hydrophilic vinyl monomers having the formulas

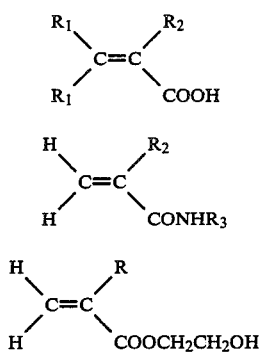

wherein $R_1$ is H or COOH, $R_2$ is H or $CH_3$ and $R_3$ is H or $CH_2OH$,
with (B) an emulsifier component, and with (C) water, to obtain a pre-emulsion that is free of an initiator for initiating polymerization of said monomers, said pre-emulsion containing from 2 to 15% by weight of said emulsifier component, based on the weight of said mixture of vinyl monomers, said emulsifier component consisting of a mixture of a nonionic surfactant and an anionic surfactant wherein the amount of said anionic surfactant is from 5 to 40% by weight, based on the weight of said nonionic surfactant; placing in a polymerization reactor an initial charge consisting essentially of either (i) water, (ii) from 5 to 30% by weight of the total amount of said pre-emulsion, or (iii) both of (i) and (ii); then separately and successively adding to said initial charge (a) the remainder of said pre-emulsion and (b) an initiator for initiating polymerization of said monomers, over a period of time and under conditions effective to carry out emulsion copolymerization of said monomers whereby to obtain an aqueous latex containing from 65 to 75% by weight of solids and having a viscosity in the range of from 500 to 30,000 cP, the amount of said initiator being in the range of from 0.1 to 1.0% by weight, based on the weight of said mixture of vinyl monomers.

5. A process as claimed in claim 4 in which said initiator comprises potassium persulfate or ammonium persulfate.

6. A process as claimed in claim 4 in which the emulsion copolymerization is carried out at a temperature of from 50° to 90° C. for from 5 to 10 hours.

7. A process as claimed in claim 4 in which said initial charge consists of water.

8. A process as claimed in claim 4 in which said initial charge consists of from 5 to 30% by weight of the total amount of said pre-emulsion.

9. A process as claimed in claim 4 in which said initial charge consists of water and from 5 to 30% by weight of the total amount of said pre-emulsion.

10. An adhesive composition prepared by the process of claim 4.

11. An adhesive composition as set forth in claim 10, wherein the average particle size of the particles in said dispersion is 0.2 to 2.0 microns.

12. An adhesive composition as claimed in claim 10 in which said mixture of vinyl monomers also contains at least one vinyl monomer selected from the group consisting of methyl methacrylate, ethyl methacrylate, propyl methacrylate, butyl methacrylate, hexyl methacrylate, octyl methacrylate, vinyl acetate, styrene, ethylene and vinyl chloride.

13. An adhesive composition as claimed in claim 10 in which said mixture of vinyl monomers contains from 1 to 10% by weight of said hydrophilic vinyl monomer component, based on the weight of said mixture, and said hydrophilic vinyl monomer component is at least one member selected from the group consisting of acrylic acid, methacrylic acid, fumaric acid, maleic acid, acrylamide, methacrylamide, N-methylolacrylamide, N-methylolmethacrylamide, 2-hydroxyethyl acrylate and 2-hydroxyethyl methacrylate.

14. An adhesive composition as claimed in claim 13 in which said acrylate ester monomer is selected from the group consisting of methyl acrylate, ethyl acrylate, propyl acrylate, butyl acrylate, 2-ethylhexyl acrylate and decyl acrylate and the average particle size of the particles of the emulsion is from 0.2 to 2.0 microns.

* * * * *

UNITED STATES PATENT AND TRADEMARK OFFICE
CERTIFICATE OF CORRECTION

PATENT NO. : 4 590 238
DATED : May 20, 1986
INVENTOR(S) : Mitsuru Furomoto et al It is certified that error appears in the above-identified patent and that said Letters Patent is hereby corrected as shown below:

Column 6, lines 1-5; change the formula to read as follows:

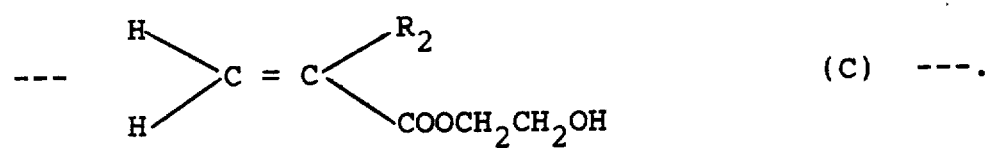

Column 7, lines 12-15; change the formula to read as follows:

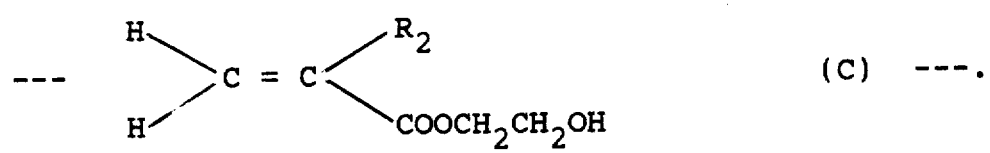

Signed and Sealed this

Twenty-first Day of October, 1986

[SEAL]

Attest:

DONALD J. QUIGG

Attesting Officer     Commissioner of Patents and Trademarks